United States Patent [19]

Masse et al.

[11] Patent Number: 5,721,316

[45] Date of Patent: Feb. 24, 1998

[54] PROCESS FOR INCORPORATION OF EXPOXIDIZED POLYDIENES INTO EPOXY RESINS

[75] Inventors: Michael Alan Masse, Richmond; Kailash Dangayach, Houston; James Robert Erickson, Katy, all of Tex.

[73] Assignee: Shell Oil Company, Houston, Tex.

[21] Appl. No.: 675,746

[22] Filed: Jul. 3, 1996

Related U.S. Application Data

[60] Provisional application No. 60/001,087 Jul. 12, 1995.

[51] Int. Cl.$^6$ ............................................. C08L 53/00
[52] U.S. Cl. ........... 525/92 H; 525/107; 525/524; 525/529; 525/901
[58] Field of Search .................... 525/92 H, 107, 525/524, 529, 901

[56] References Cited

U.S. PATENT DOCUMENTS

| | | | |
|---|---|---|---|
| H1517 | 2/1996 | Erickson et al. | 525/314 |
| H1597 | 9/1996 | Erickson | 525/314 |
| 3,555,112 | 1/1971 | Winkler | 525/314 |
| 3,663,659 | 5/1972 | Kray et al. | 525/314 |
| 3,919,348 | 11/1975 | Foster et al. | 525/524 |
| 4,237,245 | 12/1980 | Halasa et al. | 525/272 |
| 4,433,078 | 2/1984 | Kersten et al. | 525/524 |
| 4,518,753 | 5/1985 | Richards et al. | 526/178 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/92 |
| 5,356,993 | 10/1994 | Erickson et al. | 525/314 |
| 5,376,745 | 12/1994 | Handlin, Jr. et al. | 526/178 |
| 5,420,202 | 5/1995 | St. Clair et al. | 525/92 H |
| 5,428,114 | 6/1995 | Erickson et al. | 525/331.9 |
| 5,461,112 | 10/1995 | Masse et al. | 525/92 B |
| 5,478,885 | 12/1995 | Masse et al. | 525/92 H |

FOREIGN PATENT DOCUMENTS

| | | | |
|---|---|---|---|
| 0396780 A1 | 11/1989 | European Pat. Off. | C08F 297/04 |
| 0441485 A2 | 1/1991 | European Pat. Off. | C08F 236/04 |
| 62-178718 | 7/1987 | Japan | H05K 1/03 |
| 2-275256 | 10/1990 | Japan | C08L 63/00 |
| 2-409745 | 12/1990 | Japan | C08L 63/00 |
| 6256417A | 9/1994 | Japan | C08F 8/08 |

OTHER PUBLICATIONS

United Kingdom Search Report of Mar. 10, 1996.

"Vinyl Ethers: Versatile Monomers for Coatings Appliations," W. J. Burlant, J. S. Plotkin, F. J. Vara, International Specialty Products, RadTech Asia '91, Osaka, Japan, Apr. 1991.

Serial No. 08/228,047, Apr. 15, 1994 Erickson et al.
Serial No. 08/320,807, Oct. 1994, Erickson et al.
Serial No. 08/320,803, Oct. 1994, Erickson et al.
Serial No. 08/320,804, Oct. 1994, Erickson et al.
Serial No. 08/320,809, Oct. 1994, St. Clair et al.
Serial No. 08/320,800, Oct. 1994, St. Clair et al.
Serial No. 08/320,802, Oct. 1994, St. Clair.
Serial No. 08/320,808, Oct. 1994, St. Clair et al.

*Primary Examiner*—Randy Gulakowski
*Attorney, Agent, or Firm*—Donald F. Haas

[57] ABSTRACT

A process for incorporation of epoxidized polydienes into aromatic epoxy resins which comprises (a) blending the epoxidized polydiene into a curing agent in a ratio of 1:20 to 1:4, (b) reacting the epoxidized polydiene and a curing agent at a temperature of from 100° to 150° C. over a time from 10 to 100 minutes, (c) mixing the pre-reacted epoxidized polydiene and curing agent with the aromatic epoxy resin and accelerator, and (d) curing the aromatic epoxy resin by heating the full mixture of paragraph (c) to a temperature of from 110° to 170° C. for from 2 to 6 hours.

16 Claims, No Drawings

PROCESS FOR INCORPORATION OF EXPOXIDIZED POLYDIENES INTO EPOXY RESINS

CROSSREFERENCE TO RELATED APPLICATIONS

This application claims the benefit of U.S. Provisional Application No. 60/001,087, filed Jul. 12, 1995.

BACKGROUND OF THE INVENTION

The invention relates to the use of epoxidized low viscosity polydiene polymers in combination with epoxy resins. More specifically, blends of epoxy resins and epoxidized low viscosity polydiene polymers are made by a novel process.

Cured epoxy resins are typically strong, rigid, hard materials. Further, because of their chemical constitution they adhere strongly to many substrate materials. These physical characteristics of cured epoxy resins make them useful in a broad range of applications. One disadvantage of cured epoxy resins is their brittle character. When subjected to impact, cyclic stresses, thermal stresses, or differences in adhesive-substrate expansivities, epoxy resins tend to fail at relatively low applied stresses in a brittle manner. The goal of much effort in this area has been to improve the toughness, or equivalently stated, the energy required to fracture, epoxy resins. Improvements in this regard lead to mechanically superior materials.

Therefore, it would be advantageous if an epoxy resin composition with increased toughness could be achieved. Importantly, the desired increase in toughness must occur with little or no sacrifice in the beneficial mechanical properties of epoxy resins such as strength, rigidity, hardness, and adhesion.

One route to this improvement is to incorporate a rubber into the epoxy matrix. Increases in toughness by incorporation of a rubber phase in an epoxy matrix are well known. Carboxy functional rubbers, as described in commonly assigned U.S. Pat. No. 3,823,107 entitled "Epoxy Resin Curing Agent Compositions, Their Preparation and Use," have been used as modifiers for epoxy resins. These carboxy functional modifiers suffer the disadvantage that they must be pre-reacted with the epoxy resin before cure so that useful improvements in properties are achieved. Anhydride or acid functional graft copolymers, as described in U.S. Pat. No. 5,115,019 entitled "Carboxy-Functional Hydrogenated Block Copolymer Dispersed in Epoxy Resin," and U.S. Statutory Invention Registration (T-4577), entitled "Epoxy Resin Composition," have been used as modifiers for epoxy resins. These rubbers also suffer the disadvantage that pre-reaction is required. Further, in some cases solvent blending and formation of emulsions of the polymeric modifier is required. The processes required to disperse these polymers possess the further disadvantage that the resulting dispersion of rubber in epoxy is sensitive to the process parameters such as temperature and shear rate during mixing, length of time of mixing, and type and amount of solvent so that inconsistent products are produced with varying properties.

Low viscosity epoxidized polydiene polymers are known to be used in modification of epoxy resins. Such polymers are described in commonly assigned U.S. Pat. No. 5,229,464. These polymers are liquid epoxidized rubbers. Compatible blends of the polymers of the above-described patent and epoxy resins are described in allowed copending commonly assigned application Ser. No. 08/090,856, filed Jul. 12, 1993 which is herein incorporated by reference. The blends described in the aforementioned patent application have the disadvantage that their compatibility with epoxy resins is limited. Their limited compatibility does not extend to a broad range of epoxy resins and curing agents. Compatibilizing curing agents are required. They have the further disadvantage that even when marginally compatible, these polymers do not yield final cured epoxy resins having improved toughness. Additionally, the compatibilizing curing agents lead to cured epoxy resins have significantly reduced rigidity which makes them applicable in only limited applications.

Improved epoxidized rubbers which provide high fracture toughness with the retention of strength and rigidity using typical curing agents have been described in commonly assigned application Ser. No. 228,324 filed Apr. 15, 1994, entitled "Epoxidized Low Viscosity Rubber Toughening Modifiers for Epoxy Resins." While significant improvements were achieved, some deficiency is noted with regard to the strain at break of these modified epoxies. In the aforementioned patent application the chemical components of the modified epoxy are simply combined and mixed at elevated temperatures immediately before curing.

The present invention provides an improved process for preparation of such modified epoxies. The process described herein provides epoxy materials with improved strain characteristics and improved toughness. As such the process yields epoxies of enhanced utility in adhesive, encapsulation, lamination, casting, and coating applications.

SUMMARY OF THE INVENTION

This invention is a process for making an epoxy resin composition containing an epoxidized low viscosity polydiene polymer. The process generally comprises first blending the epoxidized polydiene into a curing agent which may be an anhydride curing agent. A catalyst may optionally be used at low levels, i.e., 0.1 to 5 pbw (parts per hundred by weight of the total composition, in this case, the curing agent and polydiene), to initiate limited reaction between the curing agent and the epoxidized polydiene. The reaction is conducted at temperature of from 100° to 150° C. over a time from 10 to 100 minutes. It is important that only partial reaction between the curing agent and the epoxidized polydiene take place. The pre-reacted curing agent is then mixed with the aromatic epoxy resin and the aromatic epoxy resin is cured by heating the full mixture to a temperature of from 110° to 170° C. for from 2 to 6 hours. The low viscosity epoxidized polymers are used in the blends with the aromatic epoxy resins in an amount of from 1 to 30% by weight, preferably 1 to 20%.

These low viscosity polymers may contain up to 60% by weight, of at least one vinyl aromatic hydrocarbon, preferably styrene. Polyisoprene, in the linear, radial, or star configuration, may be used. The polymers may be block or randomly copolymerized copolymers of at least two conjugated dienes, preferably isoprene and butadiene. Preferred polymers for use in this invention are described in copending, commonly assigned, U.S. patent application Ser. No. 228,047, entitled "Epoxidized Low Viscosity Rubber," filed Apr. 15, 1994, which is herein incorporated by reference. These polymers generally have a molecular weight (peak, as determined by GPC) of from 1000 to 300,000, preferably from 1000 to 100,000, and most preferably from 1000 to 20,000 and are preferably liquids.

DETAILED DESCRIPTION OF THE INVENTION

Suitable aromatic epoxy resins include glycidyl ethers prepared by the reaction of epichlorohydrin with an aromatic compound containing at least one hydroxyl group carried out under alkaline reaction conditions. The epoxy resin products obtained when the hydroxyl group-containing compound is bisphenol-A are represented below by the structure below wherein n is zero or a number greater than 0, commonly in the range of 0 to 10, preferably in the range of 0 to 2.

metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100°

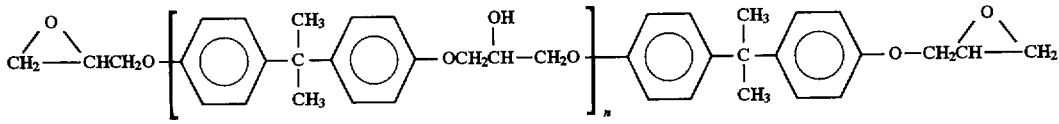

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 86 to about 10,000, preferably about 200 to about 1500. The commercially-available epoxy resin EPON® Resin 828, a reaction product of epichlorohydrin and 2,2-bis(4-hydroxyphenylpropane)(bisphenol-A) having a molecular weight of about 400, an epoxide equivalent (ASTM D-1652) of about 185–192, and an n value (from the formula above) of about 0.13, is presently the preferred epoxy resin because of its low viscosity, mechanical performance, and commercial availability. Other examples of aromatic epoxy resins are liquid resins such as EPON® 825, a reaction product of epichlorohydrin and bisphenol-A with an n value of about 0.04, EPON® 826, a reaction product of epichlorohydrin and bisphenol-A with an n value of about 0.08, and solid resins such as EPON® 1001, a reaction product of epichlorohydrin and bisphenol-A with an n value of about 2.3, EPON® 1002, a reaction product of epichlorohydrin and bisphenol-A with an n value of about 3.4, EPON® 1031, a reaction product of epichlorohydrin and tetraphenylol ethane with an epoxide equivalent weight of about 220, and the like.

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these, as well as linear, star or radial.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention. Polymers containing ethylenic unsaturation and polymers containing both aromatic and ethylenic unsaturation are available commercially from several suppliers.

In general, when solution anionic techniques are used, copolymers of conjugated diolefins and alkenyl aromatic hydrocarbons are prepared by contacting the monomer or monomers to be polymerized simultaneously or sequentially with an anionic polymerization initiator such as group IA C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The epoxidized low viscosity polymers of the present invention may have the general formula $$(A-B-A_p)_n-Y_r-(A_q-B)_m$$

wherein Y is a coupling agent or coupling monomers or initiator, and wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. Polymers of this type are described in more detail in U.S. Pat. No. 5,229,454 which is herein incorporated by reference. Generally, it is preferred that the A blocks should have a greater concentration of more highly substituted aliphatic double bonds than the B blocks have. Thus, the A blocks have a greater concentration of di-, tri-, and tetra-substituted unsaturation sites (aliphatic double bonds) per unit of block mass than do the B blocks. This produces a polymer wherein the most facile epoxidation occurs in the exterior blocks—the A blocks (1,1-disubstituted, 1,2-disubstituted, 1,1,2-trisubstituted and 1,1,2,2-tetrasubstituted olefinic epoxides). The A blocks have a molecular weight of from 100 to 6,000, preferably 100 to 3,000, most preferably 500 to 2000, and the B blocks have a molecular weight of from 1000 to 15,000, preferably 3000 to 7000. n is greater than 0, r is 0 or 1, m is greater than or equal to 0, and n+m ranges from 1 to 100. p and q may be 0 or 1.

Useful randomly epoxidized star polymers are described in U.S. Pat. No. 5,247,026 which is herein incorporated by reference. That patent describes randomly epoxidized star polymers, based on at least one conjugated diolefin monomer, that contain di-, tri- and/or tetrasubstituted olefinic epoxides. The star polymers have greater than four arms or branches. Each arm has a molecular weight from 1500 to 20,000 and contains the concentration of di-, tri-, or tetrasubstituted olefinic epoxides (1,1-disubstituted, 1,2-disubstituted, 1,1,2-trisubstituted and 1,1,2,2-tetrasubstituted olefinic epoxides) described below.

Polyisoprene homopolymers which have been epoxidized to the required extent may also be useful in toughening epoxy resins. Such polymers must be low viscosity and low molecular weight—the molecular weight should be in the range from 1000 to 20,000. These polymers, as all of the polymers described herein, may contain some amount of a vinyl aromatic hydrocarbon, preferably styrene, as described below.

When the concentration of vinyl aromatic hydrocarbon monomer in the epoxidized polymer is less than 5% by weight, the concentration of epoxide may range from 3 to 7 meq/g of polymer. When the concentration of vinyl aromatic hydrocarbon monomer is from 5% up to 20% by weight, the concentration of epoxide may range from 2 to 7 meq/g of polymer. When the concentration of vinyl aromatic hydrocarbon is from 20% to 60% by weight, the concentration of epoxide may range from 1 to 7 meq/g of polymer. If the epoxy levels are any lower, the components are not sufficiently compatible to toughen the resin. Also, at lower epoxy levels, the mixing temperature will have to be undesirably high. At higher epoxy levels, the components will be too compatible and soluble to achieve the desired phase separation upon curing. It will also raise the viscosity and the cost without any corresponding benefit.

In order to get the desired balance of properties for the compositions of the present invention, i.e., improved toughness with little or no sacrifice in strength, rigidity, or adhesion, it is important that there be some phase separation between the components in the final cured product. If the incorporated epoxidized rubber will not phase separate from the epoxy matrix during cure, the final product will be too weak and not stiff enough for enduses such as structural adhesives, coatings, and electrical encapsulation. If the amount of phase separation is too great, then the epoxidized polymer will not be finely dispersible in the epoxy matrix resulting in no property improvement and a deleterious degradation of final product appearance and product uniformity. The goal is to achieve a composition which is on the edge of compatibility and incompatibility and each epoxy resin formulation may have its own particular epoxidized polydiene polymer that works best in this regard. The epoxy level, degree of unsaturation, and styrene content of the preferred polymers of this invention are specified herein to achieve such a degree of compatibility with epoxy resins.

The epoxidized rubber modified epoxy resins can be cured with from about 1 to about 60, preferably about 30 to about 60, weight percent curing agent based on the epoxy resin composition. Anhydride curing agents are used. Such anhydride curing agents may be generally described as any compound containing one or more anhydride functional groups. Most commonly used anhydrides have an aromatic, cycloaliphatic, or aliphatic structure. The curing agent may be selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids. Examples include phthalic anhydride (PA), tetrahydrophthalic anhydride (THPA), nadic methyl anhydride (NMA), hexahydrophthalic anhydride (HHPA), pyromellitic dianhydride (PMDA), methyltetrahydrophthalic anhydride (MTHPA), and dodecenylsuccinic anhydride (DSA), and the like. In addition, multifunctional carboxylic acids will provide similar performance. The anhydride is combined with the modified epoxy resins such that a suitable anhydride/epoxy molar ratio is achieved. This ratio should range from 0.8/1.0 to 1.2/1.0 to achieve suitably complete epoxy network formation. We have found that the ratios which are most useful in achieving improved properties are those that are as close as possible to 1/1. Typically, the anhydride cures are conducted at elevated temperatures, 100° to 170° C. for a period of 30 minutes to 6 hours, and are often referred to as "bake cures." The anhydride bake cures can be accelerated by using a curing accelerator.

Suitable curing accelerators include trialkyl amines, ammonium salts, and imidazoles. Benzyldimethylamine (BDMA), 2-ethyl-4-methylimidazole (EMI) and tetrabutylammonium bromide are examples of useful accelerators.

The process is generally carried out as follows: the epoxidized polydiene is blended into the curing agent by low shear mechanical mixing or by manual mixing. The amount of epoxidized polydiene is such that it makes up less than 50 percent by mass of the pre-reacting mixture. Crosslinking of the rubber in this pre-reaction is not desirable. When the epoxidized diene constitutes the minority of the pre-reacting mixture crosslinking is less likely. The preferred epoxidized polydiene to anhydride ratio ranges from 1:20 to 1:4.

This reaction is conducted at temperature from 100° to 150° C. because these elevated temperatures are required to drive the reaction between the anhydride and epoxy groups over a time from 10 to 100 minutes to effect a limited reaction. It is very important that only partial reaction between the curing agent and the epoxidized polydiene take place. If the reaction takes place to such an extent that the mixture gels, then subsequent combination with the epoxy resin is difficult, the rubber will not be finely dispersable which is required to achieve the desired balance of properties, and casting or processing the mixture by methods requiring flow will be prohibited. A catalyst may optionally be used at low levels, i.e., from 0.1 to 5 pbw, to expedite the limited reaction between the curing agent and the epoxidized rubber. Suitable catalysts include tetrabutylammonium bromide, benzyldimethylamine (BDMA), 2-ethyl-4-methylimidazole, and triethylamine.

The pre-reacted curing agent is then mixed with the aromatic epoxy resin in a ratio such that the polydiene preferably is present at a level of 1.0 to 20 pbw of the total composition. The ratio is important because the amount of rubber in the final cured epoxy affects the ultimate mechanical properties. Curing of the resin is accomplished by incorporating an accelerator if not already present in the pre-reacted mixture and heating the full mixture to a temperature of 110° to 170° C. for a period of 2 to 6 hours. In a preferred embodiment of the process, the cure is accomplished by heating the full mixture to a temperature of 110° to 130° C. for 2 to 3 hours followed by 3 to 4 hours at 150° to 170° C. This staggered approach is preferred because the low temperature first stage drives the curing reaction in a less vigorous manner so that excessive reaction exotherms, which would thermally degrade the modified resin mixture, are avoided. The high temperature second stage serves to drive the reaction to completion, forming the extensive three-dimensional covalent network characteristic of mechanically effective epoxies so that the majority of the functional groups have reacted.

The compositions may include other additives, such as extenders, plasticizers, pigments, reinforcing agents, flow control agents and flame retardants. Stabilizers known in the art may also be incorporated into the epoxy composition. These may be for protection during the life of the article against, for example, oxygen, ozone and ultra-violet radiation. These may also be for stabilization of thermo-oxidative degradation during elevated temperature processing. Antioxidants which interfere with the curing reaction should be avoided.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. The polymers may have different diene blocks and these diene blocks may be selectively hydrogenated as described in U.S. Pat. No. 5,229,464 which is also herein incorporated by reference.

The toughened epoxy resin compositions of this invention may be used in a broad variety of applications. They are useful in adhesives, including contact adhesives, laminated adhesives, and assembly adhesives, but they have special utility in structural adhesives where they may be combined with a broad range of curing agents to form excellent products which adhere to metals, plastic, wood, glass, and other substrates. They also have special utility in coatings (especially primers, topcoats for automotive, epoxy primers for metal, polyester coil coatings, alkyd maintenance coatings, etc.) where they may be combined with pigments and curing agents to form excellent products. Other applications for these compositions include electrical applications such as castings, encapsulants, potting compounds, solder masking compounds, and laminates and construction applications such as flooring, civil engineering, concrete repair and consolidation, secondary containment of tankage, grouts, sealants, polymer concrete, structural composites, tooling, etc.

EXAMPLES

The epoxidized polydiene used in these examples was a linear diblock copolymer of isoprene and butadiene represented as I-B. The isoprene block had a molecular weight of 800. The butadiene block had a molecular weight of 4600. The diblock was epoxidized to an epoxy level of 4.8 meq/g. The epoxy resin was EPON® 828 resin manufactured by Shell Chemical Company. The anhydride was methyl-tetrahydro-phthalic anhydride (Lindride 12 from Lindau Chemical). The accelerator used for the final cures was ethyl-methyl-imidazole (Imicure EMI-24 from Pacific Anchor Chemical).

The entire masses of epoxidized polydiene and anhydride required for each sample were mixed together for the pre-reaction. Table 1 shows the amounts, expressed in grams, used for the various rubber levels.

TABLE 1

| Nominal Epoxidied Polydiene Level | Pre-reaction | | Additional Components for Final Cure | |
|---|---|---|---|---|
| | Epoxidized Polydiene | MTHPA | EPON ® 828 | EMI-24 |
| 0% | 0.0 | 71.1 | 80.0 | 0.8 |
| 5% | 4.0 | 70.7 | 76.0 | 0.8 |
| 10% | 8.0 | 70.4 | 72.0 | 0.8 |
| 15% | 12.0 | 70.0 | 68.0 | 0.8 |

The pre-reactions were conducted at 100° and 140° C. in a convection air oven for 1 hour. The additional components were then combined with the pre-reacted mixture and poured into glass molds to form ⅛" thick plaques. The final cure was carried out by heating the complete mixtures to 120° C. for 2 hours followed by heating to 150° C. for 4 hours.

Several performance properties of the cured modified epoxy resin compositions of the present invention were measured. The tensile properties such as strength, ultimate strain, and Young's modulus were measured according to ASTM D-638. The tensile fracture toughness as characterized by the stress intensity factor ($K_{1c}$) for crack propagation was measured according to ASTM E-399-83. Using the value of $K_{1c}$ so measured, the fracture energy ($G_{1c}$) was calculated for the plane strain conditions employed.

The results of the mechanical testing are shown in Table 2. In the table, $K_{1c}$ is the critical stress intensity factor, $G_{1c}$ is the fracture energy, δ is the tensile strength, ε is the ultimate tensile strain, and E is the tensile modulus. The absolute values of the fracture energy and strain results are listed along with their normalized values. The normalized values are calculated by dividing by that value from the 0% rubber sample at each temperature and for each measured value. The normalized results show that very high fracture energies can be achieved while minimizing the reduction in ultimate strain by pre-reaction at temperatures of 100° to 140° C.

Comparative Examples

Comparative examples were produced according to the same procedure outline in the examples except either no pre-reaction was done or the pre-reaction was conducted at temperatures less than 100° C. The results are listed in Table 3. These results show that without pre-reaction or with pre-reaction but at temperatures less than 100° C. the enhanced fracture energy and retention of ultimate strain is not achieved.

3. The process of claim 2 wherein the accelerator is selected from the group consisting of tetrabutyl ammonium bromide, 2-ethyl-4-methylimidazole, benzyldimethylamine, and triethylamine.

4. The process of claim 1 wherein step (d) is carried out by heating the full mixture to a temperature of from 110° to 130° C. for 2 to 3 hours followed by heating the full mixture to a temperature of from 150° to 170° C. for 3 to 4 hours.

5. The process of claim 1 wherein the epoxidized polydiene polymer has the structural formula

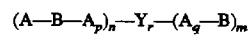

wherein Y is a coupling agent or coupling monomers or initiator, and wherein A and B are polymer blocks which are homopolymer blocks of conjugated diolefin monomers or copolymer blocks of conjugated diolefin monomers, the A blocks have a weight average molecular weight of from 100 to 6,000 and the B blocks have a weight average molecular

TABLE 2

| Pre-reaction Temperature (°C.) | Nominal Epoxidized Polydiene Level (%) | $K_{1c}$ (psi in$^{1/2}$) | $G_{1c}$ (J/m$^2$) | $G_{1c}$ Normalized | δ (psi) | ε (%) | ε Normalized | E (ksi) |
|---|---|---|---|---|---|---|---|---|
| 100 | 0 | 487 | 89 | 1.00 | 11,110 | 6.9 | 1.00 | 419 |
| 100 | 10 | 1001 | 376 | 4.23 | 11,030 | 5.4 | 0.78 | 407 |
| 140 | 0 | 475 | 88 | 1.00 | 11,410 | 6.3 | 1.00 | 403 |
| 140 | 10 | 1101 | 466 | 5.30 | 11,180 | 5.9 | 0.94 | 398 |

TABLE 3

| Pre-reaction Temperature (°C.) | Nominal Epoxidized Polydiene Level (%) | $K_{1c}$ (psi in$^{1/2}$) | $G_{1c}$ (J/m$^2$) | $G_{1c}$ Normalized | δ (psi) | ε (%) | ε Normalized | E (ksi) |
|---|---|---|---|---|---|---|---|---|
| no pre-reaction | 0 | 518 | 92 | 1.00 | 10,950 | 6.2 | 1.00 | 460 |
| no pre-reaction | 5 | 751 | 196 | 2.13 | 11,350 | 4.0 | 0.65 | 449 |
| no pre-reaction | 10 | 912 | 292 | 3.17 | 11,720 | 4.6 | 0.74 | 438 |
| no pre-reaction | 15 | 1091 | 435 | 4.73 | 9,916 | 3.3 | 0.53 | 418 |
| 60 | 0 | 544 | 113 | 1.00 | 11,450 | 7.0 | 1.00 | 427 |
| 60 | 5 | 826 | 259 | 2.29 | 11,170 | 6.6 | 0.94 | 408 |
| 60 | 10 | 983 | 369 | 3.27 | 11,010 | 5.6 | 0.80 | 400 |
| 60 | 15 | 1201 | 569 | 5.04 | 8,311 | 3.1 | 0.44 | 381 |
| 80 | 0 | 575 | 123 | 1.00 | 11,110 | 8.1 | 1.00 | 422 |
| 80 | 5 | 780 | 226 | 1.84 | 11,480 | 7.5 | 0.93 | 418 |
| 80 | 10 | 1039 | 412 | 3.35 | 11,080 | 6.3 | 0.78 | 400 |
| 80 | 15 | 995 | 400 | 3.25 | 10,168 | 4.5 | 0.56 | 372 |

We claim:

1. A process for incorporation of epoxidized polydienes into aromatic epoxy resins which comprises:
   (a) blending an epoxidized polydiene into a curing agent in a ratio of 1:20 to 1:4,
   (b) reacting the epoxidized polydiene and curing agent at a temperature of from 100° to 150° C. over a time from 10 to 100 minutes,
   (c) mixing the pre-reacted epoxidized polydiene and curing agent with the aromatic epoxy resin and an accelerator wherein the epoxidized polydiene comprises from 1.0 to 20 pbw of the total composition, and
   (d) curing the mixture of paragraph (c) by heating said mixture to a temperature of from 110° to 170° C. for from 2 to 6 hours.

2. The process of claim 1 wherein the epoxidized polydiene and a curing agent are pre-reacted in the presence of a catalyst.

weight of from 1000 to 15,000, n is greater than 0, r is 0 or 1, m is greater than or equal to 0, n+m ranges from 1 to 100, and p and q may be 0 or 1, wherein the polymer contains from 1.0 to 7.0 milliequivalents of epoxy per gram of polymer and wherein the molecular weights are peak molecular weights as determined by gel permeation chromatography.

6. The process of claim 1 wherein the curing agent is selected from the group consisting of phthalic anhydride, substituted phthalic anhydrides, hydrophthalic anhydrides, substituted hydrophthalic anhydrides, succinic anhydride, substituted succinic anhydrides, halogenated anhydrides, multifunctional carboxylic acids, and polycarboxylic acids.

7. The process of claim 1 wherein the aromatic epoxy resin is a glycidyl ether prepared by the reaction of epichlorohydrin with an aromatic compound containing at least one hydroxy group carried out under alkaline reaction conditions.

8. The process of claim 1 wherein the epoxidized polydiene polymer contains from 5% up to 20% by weight of a vinyl aromatic hydrocarbon and wherein the polymer contains from 2.0 to 7.0 milliequivalents of epoxy per gram of polymer.

9. The process of claim 8 wherein the epoxidized polydiene polymer has the structural formula

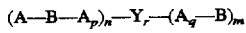

wherein Y is a coupling agent or coupling monomers or initiator, and wherein A is a block composed primarily of randomly copolymerized conjugated diene and vinyl aromatic hydrocarbon monomers, B is a polymer block which is a homopolymer block of a conjugated diolefin monomer or a copolymer block of conjugated diolefin monomers, the A blocks have a weight average molecular weight of from 100 to 6,000 and the B blocks have a weight average molecular weight of from 1000 to 15,000, n is greater than 0, r is 0 or 1, m is greater than or equal to 0, n+m ranges from 1 to 100, and p and q may be 0 or 1, wherein the molecular weights are peak molecular weights as determined by gel permeation chromatography.

10. The process of claim 8 wherein the conjugated diolefin in the A block is isoprene and the conjugated diolefin in the B block is butadiene.

11. The process of claim 1 wherein the epoxidized polydiene polymer contains from 20% up to 60% by weight of a vinyl aromatic hydrocarbon and wherein the polymer contains from 1.0 to 7.0 milliequivalents of epoxy per gram of polymer.

12. The process of claim 11 wherein the epoxidized polydiene polymer has the structural formula

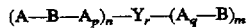

wherein Y is a coupling agent or coupling monomers or initiator, and wherein B is a block composed primarily of randomly copolymerized conjugated diene and vinyl aromatic hydrocarbon monomers, A is a polymer block which is a homopolymer block of a conjugated diolefin monomer or a copolymer block of conjugated diolefin monomers, the A blocks have a weight average molecular weight of from 100 to 6,000 and the B blocks have a weight average molecular weight of from 1000 to 15,000, n is greater than 0, r is 0 or 1, m is greater than or equal to 0, n+m ranges from 1 to 100, and p and q may be 0 or 1, wherein the molecular weights are peak molecular weights as determined by gel permeation chromatography.

13. The process of claim 12 wherein the conjugated diolefin in the A block is isoprene and the conjugated diolefin in the B block is butadiene.

14. The process of claim 1 wherein the epoxidized polymer is polyisoprene which contains from 1.0 to 7.0 milliequivalents of epoxy per gram of polymer and has a weight average molecular weight of from 1000 to 20,000, said molecular weight being a peak molecular weight as determined by gel permeation chromatography.

15. The process of claim 1 wherein the epoxidized polymers contain from 1.0 to 7.0 milliequivalents of epoxy per gram of polymer and are randomly polymerized star copolymers of at least two conjugated diolefin monomers and contain di-, tri- and/or tetrasubstituted olefinic epoxides and wherein each arm has a weight average molecular weight from 1500 to 15,000, said molecular weight being a peak molecular weight as determined by gel permeation chromatography.

16. The process of claim 1 wherein the epoxidized polydiene polymer contains less than 5 percent by weight of a vinyl aromatic hydrocarbon and wherein the polymer contains from 3.0 to 7.0 milliequivalents of epoxy per gram of polymer.

* * * * *